April 17, 1951 S. P. DI ROSA ET AL 2,548,958
TOASTER
Filed Aug. 12, 1947 4 Sheets-Sheet 1
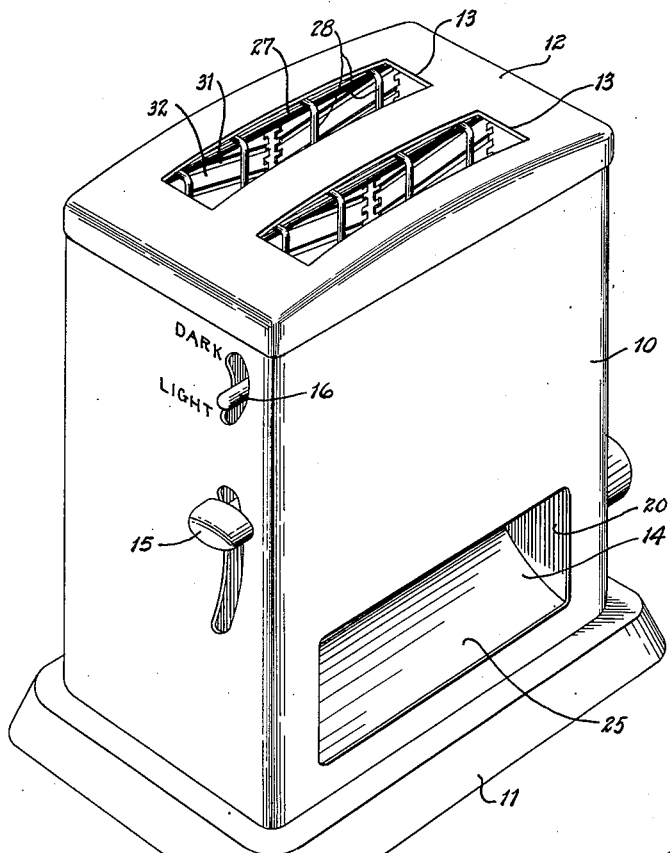
Fig.1
Fig.3
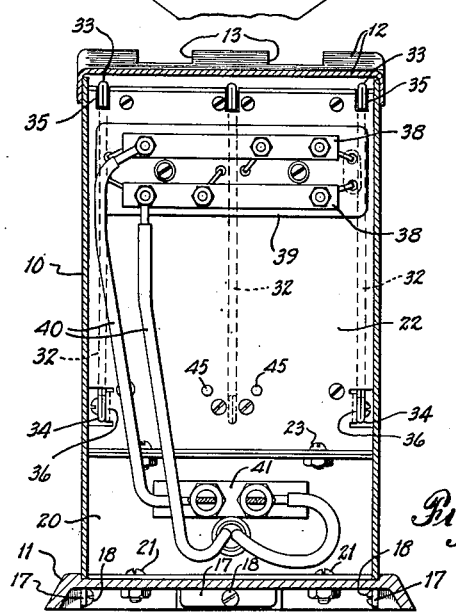
Fig.2
INVENTORS
Stephen P. DiRosa
Raymond R. Schur
BY
Morgan, Finnegan & Durham
ATTORNEYS.

April 17, 1951     S. P. DI ROSA ET AL     2,548,958
TOASTER
Filed Aug. 12, 1947     4 Sheets-Sheet 2
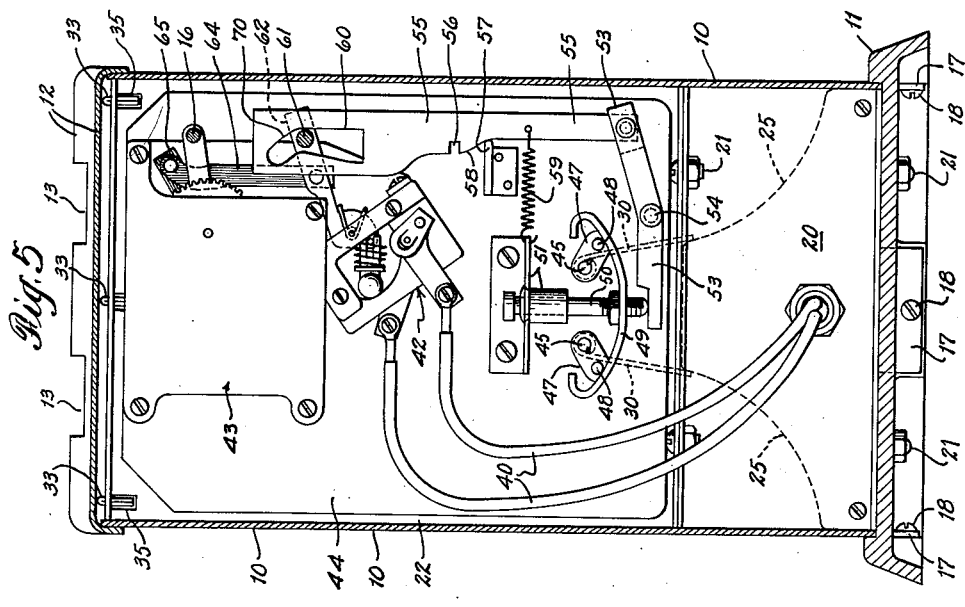
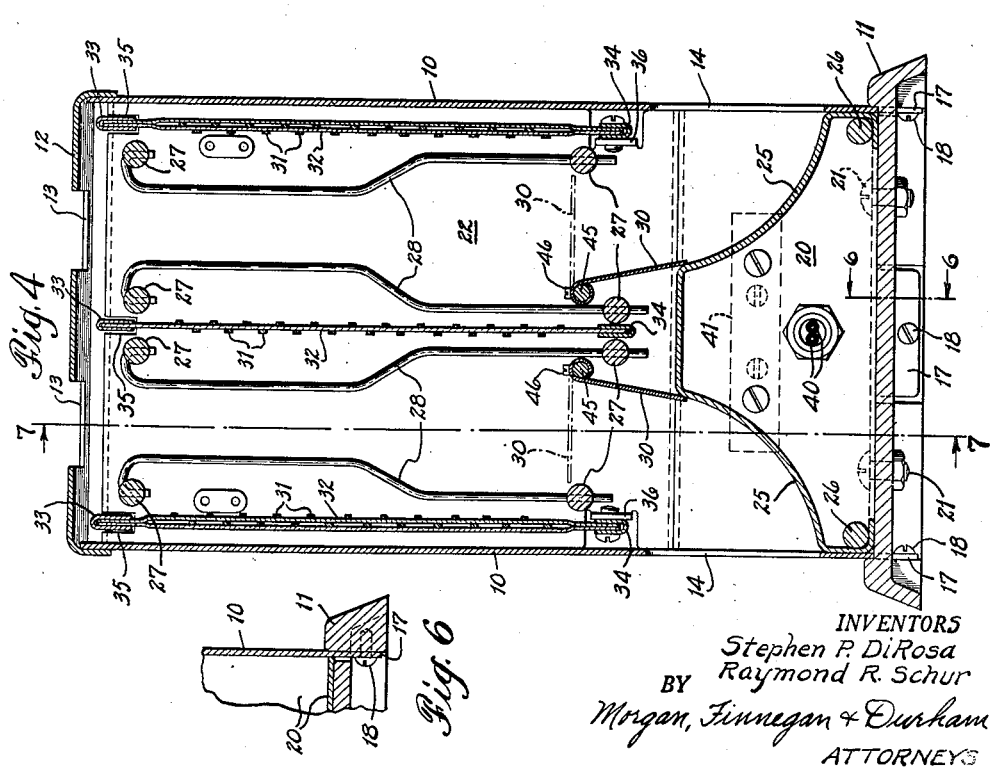
INVENTORS
Stephen P. DiRosa
Raymond R. Schur
BY
Morgan, Finnegan & Durham
ATTORNEYS INVENTORS.
Stephen P. DiRosa
BY Raymond R. Schur
Morgan, Finnegan & Durham
ATTORNEYS.

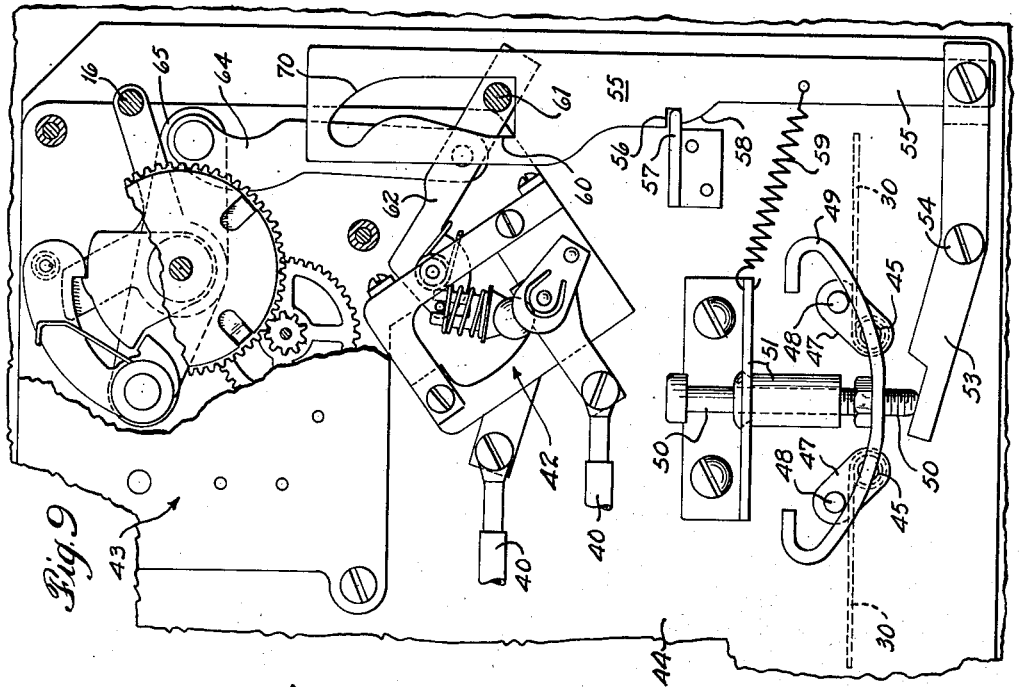
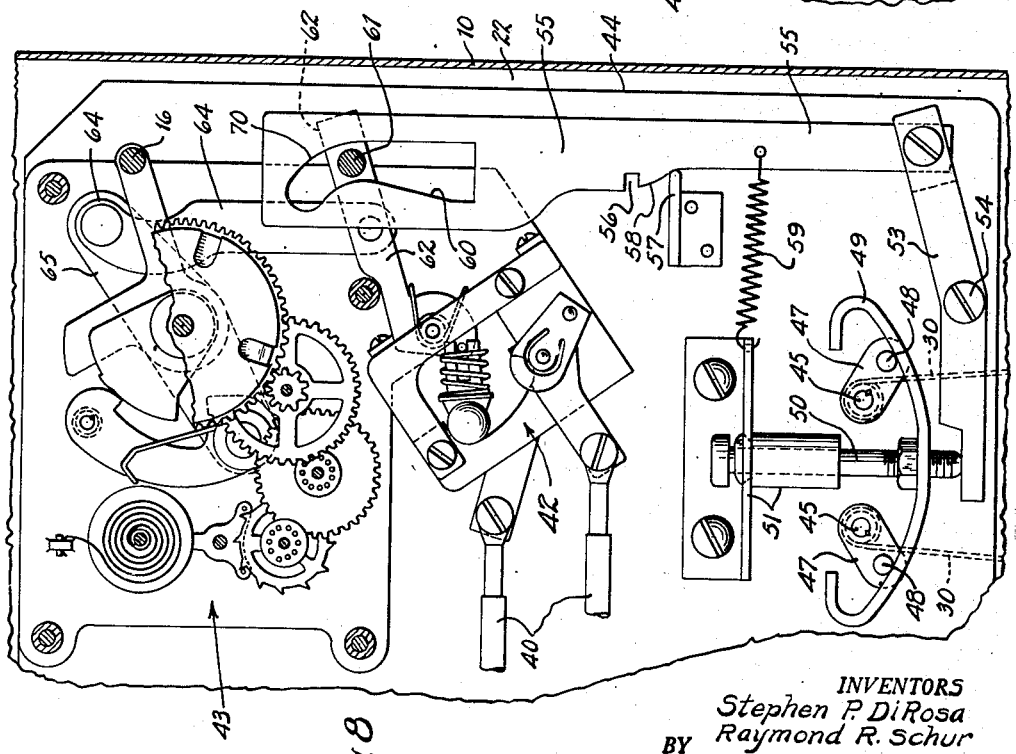

Patented Apr. 17, 1951

2,548,958

UNITED STATES PATENT OFFICE 2,548,958

TOASTER

Stephen P. DiRosa, New York, and Raymond R. Schur, East Rockaway, N. Y.

Application August 12, 1947, Serial No. 768,130

4 Claims. (Cl. 99—327)

The present invention relates to an improved bread toasting machine.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a perspective view of an electric bread toaster embodying the present invention;

Fig. 2 is a vertical cross-sectional view taken through the casing of the toaster shown in Fig. 1 adjacent the more remote end thereof as depicted in Fig. 1;

Fig. 3 is a perspective view of one of the heating elements of the toaster shown removed and separated from the device;

Fig. 4 is a vertical cross-sectional view taken centrally through the toaster shown in Fig. 1;

Fig. 5 is a vertical cross-sectional view taken through the casing of the toaster shown in Fig. 1 adjacent the nearer end thereof as depicted in Fig. 1;

Fig. 6 is a detail cross-sectional view taken along line 6—6 of Fig. 4;

Fig. 8 is a fragmentary cross-sectional view corresponding to Fig. 5 but disclosing the details of the clockwork timing mechanism; and, Fig. 9 is a cross-sectional view corresponding to Fig. 8 but showing the clockwork timing mechanism, switch and gate mechanism in toasting position.

Figure 7:
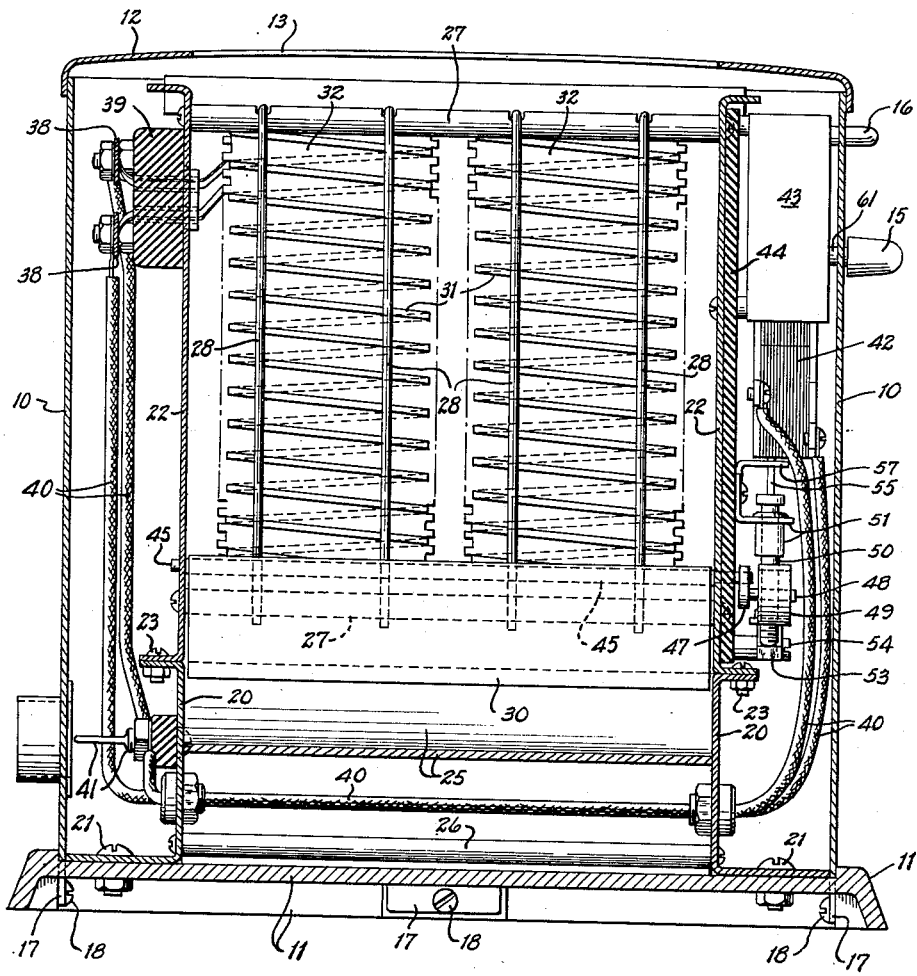
Fig. 7 is a cross-sectional view taken along line 7—7 of Fig. 4.

The present invention has for an object the provision of an improved bread toasting machine of the automatic, time controlled type. The invention provides such a toaster in which the bread slices are introduced through the top and gravity delivered through the bottom after toasting has taken place. The invention thus provides a toaster of simpler mechanical operation than conventional toasters of the same characteristics, and one which is easier to keep clean since crumbs and similar refuse do not collect in the bottom but are readily discharged therefrom. Still another object is the provision of a toaster of simple, economical and efficient design and one which may be speedily and easily disassembled when repair or replacement of parts is necessary.

Referring now in detail to the illustrative embodiment of the toaster of the present invention herein shown and described by way of example, and referring first to Fig. 1, the toaster comprises generally a rectangular casing 10 upon a base 11 and provided with a cap member 12 with a pair of rectangular apertures 13 therein through which bread slices are introduced to be toasted. The toast when done is discharged by gravity through apertures 14 one of which is provided in each side of casing 10, and the toaster is of the type providing automatic discharge when toasting is completed. The handle 15 is depressed to set the device for toasting immediately prior to introduction of the bread slices, and handle 16 may be manipulated to predetermine the toasting period.

As shown the casing 10 comprises a single blank of material bent into a rectangular form and provided with a series of extensions or ears 17 at the bottom which extend through suitable apertures in the base and are secured to built up portions thereof by screws 18. The framework for the heating elements and other toasting mechanism within casing 10 comprises a pair of spaced base plates 20 flanged and secured to base 11 by means of screws 21 (Fig. 7), and a pair of upper side plates 22 flanged and supported on corresponding flanges of plates 20 and secured thereto by screws 23.

A double chute member 25 (Fig. 4) is positioned between the base plates 20 and removably assembled with respect thereto by means of a pair of spacing rods 26 secured by screws to the plates. A plurality of other spacing rods 27 (eight as illustratively shown in Fig. 4) extend between and are removably affixed to the upper side plates 22, and serve to carry, through suitable apertures therein, the bent guard bars 28. There is thus provided a pair of paths for bread slices through the device beginning at the apertures 13 in the top of the casing between the guard bars 28, and out along either side of chute 25 and through an aperture 14. A gate 30 positioned in each such path is adapted to support a bread slice within the machine until toasting is complete, and then to pivot downwardly and allow the gravity discharge of the slice of toast.

The side electric heating elements for the toaster are such as shown in detail in Fig. 3, comprising the conventional resistance wires 31 on a background plate 32 of mica or other suitable material, and upper and lower edge members 33 and 34 are provided turned over the plate 32. The elements are thus adapted to be suspended from upper side plates 22 the ends of upper edge members 33 fitting in suitable guide slots 35 provided at the top of said plates. The elements are affixed through the lower edge members 34 to suitable turned tabs 36 which are a part of plates 22. The central heating element is of somewhat different construction, which is clearly shown in Fig. 4 of the drawings, in that it has exposed resistance wires on each of its sides, and it is not secured at its lower edge, since it is sufficiently positioned by a pair of adjacent ones of the spacing bars 27.

With the construction of the toaster so far described it will be apparent that the entire mechanism may very easily be disassembled for repairs or replacements on the heating elements and other parts. The casing 10 may easily be unsecured and lifted off, and all of the parts are then at hand. The heating elements are removable simply by unsecuring the outside elements from tabs 36 and lifting them up, their electrical disconnection having first been effected.

As best shown in Figs. 2 and 7 of the drawings, the connections for the heating elements comprise a pair of bus bars 38 secured to one of the frame plates 22 on an insulating member 39, and the leads for the elements are suitably connected thereto in parallel as respects the various elements. Lead wires 40 connect said bus bars 38 to the male portion 41 of a plug to receive household current, one of the leads extending across the toaster through the chute member 25 to connect in series in the line the toggle switch 42 on the other side of the toaster.

As shown, the toggle switch 42, clockwork timing mechanism 43, and mechanism for actuating the gates 30 are positioned on the frame plate 22 opposite to that which carries the leads for the heating elements, and a sheet of insulation 44 is interposed to protect the various parts from excessive heat. Each of the gates 30 is turned around a rod 45 and affixed with screws 46. The rods 45 are journalled for rotary motion in the frame plates 22, and carry rigidly at their ends the levers 47 (Figs. 8 and 9) having pins 48 engageable with an interior, curved cam surface of a yoke member 49.

The yoke member 49 is adapted to be vertically moved in pivoting the gates 30, and is adjustably carried and guided in such motion by a free plunger 50 which is received in a bracket bearing unit 51 secured to a frame plate 22. With the construction so described it will be apparent that as plunger 50 is raised, rods 45 will be pivoted and gates 30 raised to support bread slices for toasting, while when plunger 50 is allowed to fall to its lower position, the gates 30 will fall to allow the toast held thereby to drop and pass along chute member 25 to the exterior of the toaster.

The actuating means for the plunger 50 comprises a bent lever 53 pivotally mounted as at 54 engaging at one end the lower extremity of the plunger and having pivotally connected to its other end the latch bar 55. The bar 55 is provided with a lock notch 56 to receive a detent extension 57 when the bar is to be held in a down position. An edge cam surface 58 on the latch bar is adapted to ride on the detent in vertical motion of the bar, and a coiled spring 59 urges the latch bar toward the detent.

The latch bar 55 is also provided with a cam slot 60 toward its upper extent and there is positioned therein the pin 61 carried by the switch setting lever 62. The lever 62 is connected to the frame of the switch 42 hereinbefore mentioned, said switch being any conventional and suitable snap switch. As shown, the switch 42 is a toggle switch which is open when the lever 62 is in the upper position of Fig. 8 of the drawings and closed when the lever is in the down position as shown in Fig. 9, having a snap or rapid action between these positions when a center position has been passed.

Pivotally connected to the switch lever 62 is a link 64 which at its other end is connected to the setting lever 65 of the clockwork mechanism 43 hereinbefore mentioned. Said mechanism as shown is a conventional timing mechanism for electric toasters and the like, the handle 16 being set to predetermine a running time for the clockwork. The lever 65 is rotated in a clockwise direction (through link 64, lever 62, pin 61 and handle 15 thereon), and thereafter slowly returns in a timed movement in a counterclockwise direction until the predetermined time has expired, at which it snaps upwardly to its original position as shown in Fig. 8 of the drawings.

The operation of the timing, switch and toast gate construction will now be apparent. When the handle 15 is depressed as far as possible, pin 61 engaging bar 55 at the bottom of slot 60 depresses the bar, which rides with its surface 58 over detent 57 until the latter is received in notch 56, the lever then being locked in down position on the detent. The gates 30 are thereby raised to slice holding position as has been explained, and slices of bread may then be introduced. At the same time the switch lever 62 has been thrown to its down position to close switch 42, and lever 65 has been rotated to wind and start clockwork mechanism 42. Thereafter during toasting the link 64 is slowly carried upward until the snap action of the clock release returns it swiftly to its upper position. At this time the lever 62 opens switch 42, and the pin 61 on the lever engaging the curved cam surface 70 of lock bar 55, displaces the bar from detent 57. The bar is then raised by the action of spring return and cam 58 thereon and the weight of opening gates 30 and the weight of toast therein, releasing the toast to be expelled by gravity from the machine.

The invention in its broader aspects is not limited to the specific mechanisms shown and described but departures may be made therefrom, within the scope of the accompanying claims, without departing from the principles of the invention and without sacrificing its chief advantages.

What we claim is:

1. In a toaster having a pair of vertically arranged, spaced heating elements defining a toasting chamber therebetween having an open top for introduction of a bread slice and an open bottom for gravity discharge of the slice, a switch for the elements, a timing mechanism, and a pivotally mounted gate for said open bottom, the combination of lever means connected to said gate downwardly biased by gravity to open said gate, a yoke to engage said lever means to be lifted to close said gate, a vertically arranged latch bar operatively connected to said yoke to be depressed to raise said yoke and close said gate, said bar having a curved cam surface on an edge thereof and a lock notch above said surface, a detent to engage said bar at said notch and hold it in depressed position, means biasing said latch bar toward said detent for continuous contact therewith, and means interconnecting said bar, switch and timing mechanism to unlock said locking means when said mechanism opens said switch said last means including a pivotal lever and an internal cam surface at a slotted portion of said bar to be engaged by said lever to move said latch bar away from said detent against the action of said biasing means.

2. In a toaster having a plurality of vertically arranged, spaced heating elements defining toasting chambers therebetween having open tops for introduction of bread slices and open bottoms for gravity discharge of the slices, a switch for the elements, a timing mechanism, and a pivotally mounted gate for each said open bottom, the combination of individual lever means connected to each of said gates downwardly biased by gravity to open said gates, a yoke to engage both of said lever means to be lifted to close said gates, a vertically arranged latch bar operatively connected to said yoke to be depressed to raise said yoke and close said gates, said bar having a curved cam surface on an edge thereof and a lock notch above said surface, a detent to engage said bar at said notch and hold it in depressed position, means biasing said latch bar toward said detent for continuous contact therewith, and means interconnecting said bar, switch and timing mechanism to unlock said locking means when said mechanism opens said switch said last means including a pivotal lever and an internal cam surface at a slotted portion of said bar to be engaged by said lever to move said latch bar away from said detent against the action of said biasing means.

3. In a toaster having a pair of vertically arranged, spaced heating elements defining a toasting chamber therebetween having an open top for introduction of a bread slice and an open bottom for gravity discharge of the slice, a switch for the elements, a timing mechanism, and a pivotally mounted gate upwardly movable over said open bottom and downwardly movable by gravity to uncover said open bottom and release slices in said chamber, the combination of a vertically arranged latch bar, means including a pivotally mounted lever interconnecting said latch bar and said gate to be depressed to pivot said gate upwardly over said open bottom, said bar having a curved cam surface on an edge thereof and a lock notch above said surface, a detent to engage said bar at said notch and hold it in depressed position maintaining said gate over said open bottom, means biasing said latch bar toward said detent for continuous contact therewith, and means interconnecting said bar, switch and timing mechanism to disengage said bar from said detent when said mechanism opens said switch, said means including a pivotal lever controlled by said timing mechanism and engageable with said latch bar to move it against the action of said biasing means.

4. In a toaster having a pair of vertically arranged, spaced heating elements defining a toasting chamber therebetween having an open top for introduction of a bread slice and an open bottom for gravity discharge of the slice, a switch for the elements, a timing mechanism, and a pivotally mounted gate upwardly movable over said open bottom and downwardly movable by gravity to uncover said open bottom and release slices in said chamber, the combination of a vertically arranged latch bar, means including a pivotally mounted lever interconnecting said latch bar and said gate to be depressed to pivot said gate upwardly over said open bottom, said bar having a curved cam surface on an edge thereof and a lock notch above said surface, a detent to engage said bar at said notch and hold it in depressed position maintaining said gate over said open bottom, means biasing said latch bar toward said detent for continuous contact therewith, and means interconnecting said bar, switch and timing mechanism to disengage said bar from said detent when said mechanism opens said switch, said means including a pivotal lever controlled by said timing mechanism and an internal cam surface at a slotted portion of said bar to be engaged by said lever to move said latch bar away from said detent against the action of said biasing means.

STEPHEN P. DI ROSA.
RAYMOND R. SCHUR.

REFERENCES CITED

The following references are of record in the file of this patent:

UNITED STATES PATENTS

| Number | Name | Date |
| --- | --- | --- |
| 1,150,501 | Coes | Aug. 17, 1915 |
| 1,176,285 | Gibney | Mar. 21, 1916 |
| 1,529,342 | Christy | Mar. 10, 1925 |
| 1,841,301 | Schroeder et al. | Jan. 12, 1932 |
| 1,852,398 | Bersted | Apr. 5, 1932 |
| 1,948,739 | Wolcott et al. | Feb. 27, 1934 |
| 2,194,223 | Gough | Mar. 19, 1940 |
| 2,465,577 | Cox | Mar. 29, 1949 |